United States Patent [19]
Cudmore

[11] 3,795,409
[45] Mar. 5, 1974

[54] WHEELED COASTING DEVICE
[76] Inventor: Patrick Cudmore, 9 Fallon St., Cambridge, Mass. 02138
[22] Filed: Apr. 28, 1972
[21] Appl. No.: 248,446

[52] U.S. Cl. ............................................ 280/87.04
[51] Int. Cl. ............................................... B62b 3/00
[58] Field of Search ....... 280/87.04, 11.23, 11.28, 8

[56] References Cited
UNITED STATES PATENTS

| | | | |
|---|---|---|---|
| 2,633,364 | 3/1953 | Wiseley | 280/11.28 R |
| 3,362,722 | 1/1968 | Core | 280/87.04 R |
| D214,177 | 5/1969 | Greer | 280/87.04 UX |
| 2,541,327 | 2/1951 | Billinghurst | 280/8 UX |

FOREIGN PATENTS OR APPLICATIONS

| | | | |
|---|---|---|---|
| 616,723 | 1/1949 | Great Britain | 280/87.04 |
| 1,007,224 | 4/1957 | Germany | 280/11.28 |

*Primary Examiner*—Leo Friaglia
*Assistant Examiner*—Randall A. Schrecengost
*Attorney, Agent, or Firm*—Chittick, Thompson & Pfund

[57] ABSTRACT

A wheeled coasting device having a one-piece molded plastic thin shell construction. The device has a riding platform and front and rear integral resilient suspension arms which extend downwardly and centrally. The suspension arms mount two parallel axles, each of which carries a wide cylindrically shaped ridged tire. When the rider shifts his weight laterally, the platform tilts, the suspension arms pivot, and the tires cock in opposite directions causing the coasting device to turn in the direction that the rider is leaning.

13 Claims, 5 Drawing Figures

3,795,409

WHEELED COASTING DEVICE

BACKGROUND OF THE INVENTION

This device is an improvement over the conventional skate board which is a flat rectangular platform having a pair of roller skate wheels mounted under the front of the platform and another pair of roller skate wheels mounted under the rear of the platform. The wheel diameter on a conventional skate board is too small for practicable use on anything other than hard, smooth road surfaces.

The conventional skate board is quite unstable laterally because its wheels are paired relatively close together. A skate board is also quite harsh to ride because all bumps and jolts are transmitted directly from the wheels to the rider.

It is an object of this invention to provide a wheeled coasting device which has greatly improved turning, handling and shock absorbing characteristics in comparison with a conventional skate board and can be used on softer, safer play surfaces such as grass or sand.

It is another object of this invention to provide a wheeled coasting device which is molded in a one-piece plastic thin shell construction that is economical to manufacture and very durable to use.

SUMMARY OF THE INVENTION

The wheeled coasting device of this invention, in its preferred embodiment, is molded of a very strong plastic material in a unique shape which provides both a riding platform and the suspension components for the axles and wheels. The coasting device is adapted for use by a child in the standing, kneeling, sitting or prone positions.

The rider turns the coasting device by leaning in the direction he desires to turn. The turning action is produced by a flexing or pivoting of all four integral suspension arms which occurs as the platform tilts in response to the changes in the rider's weight distribution on the adjacent platform areas. The suspension arms on the lower side flex more and become horizontally closer together. The suspension arms on the upper side flex less (i.e., unflex) and become horizontally farther apart. This causes the wheels to cock oppositely. Thus, the coasting device turns in the direction the rider is leaning. The pivoting suspension arms produce both the turning action and the shock absorbing action.

DESCRIPTION OF THE PREFERRED EMBODIMENT

Figure 2:
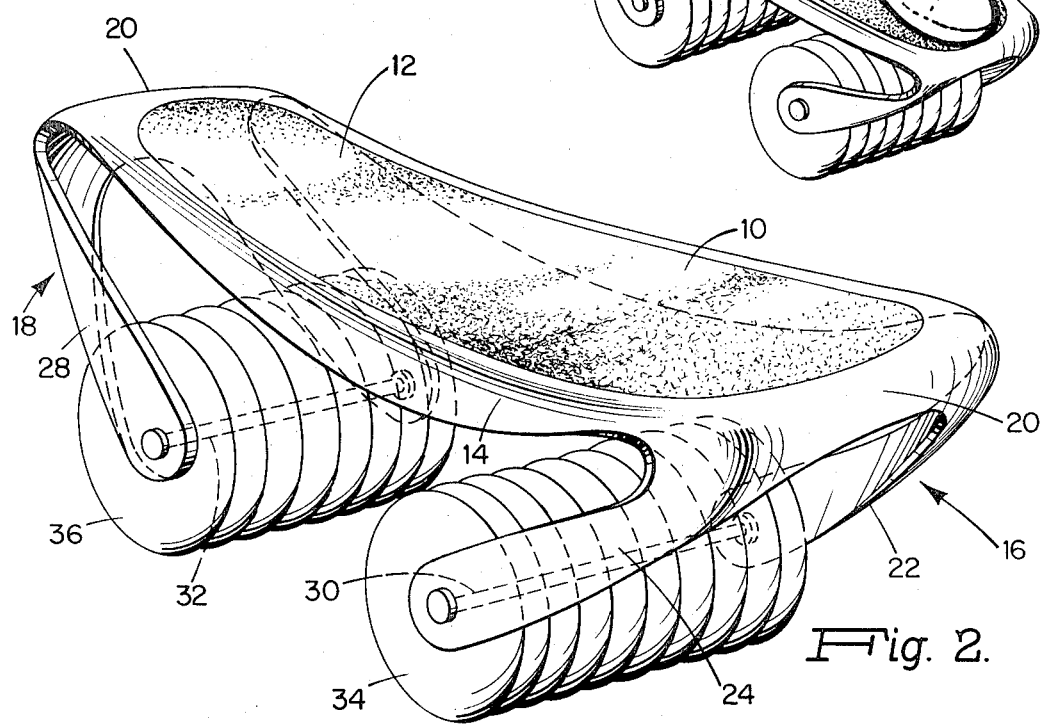
FIG. 2 is an enlarged perspective view of the coasting device shown in FIG. 1.

FIG. 2 shows the preferred embodiment of the wheeled coasting device of this invention. The device has a one-piece molded plastic thin shell structure which has a very attractive appearance composed of a multiplicity of flowing curved surfaces.

Figure 1:
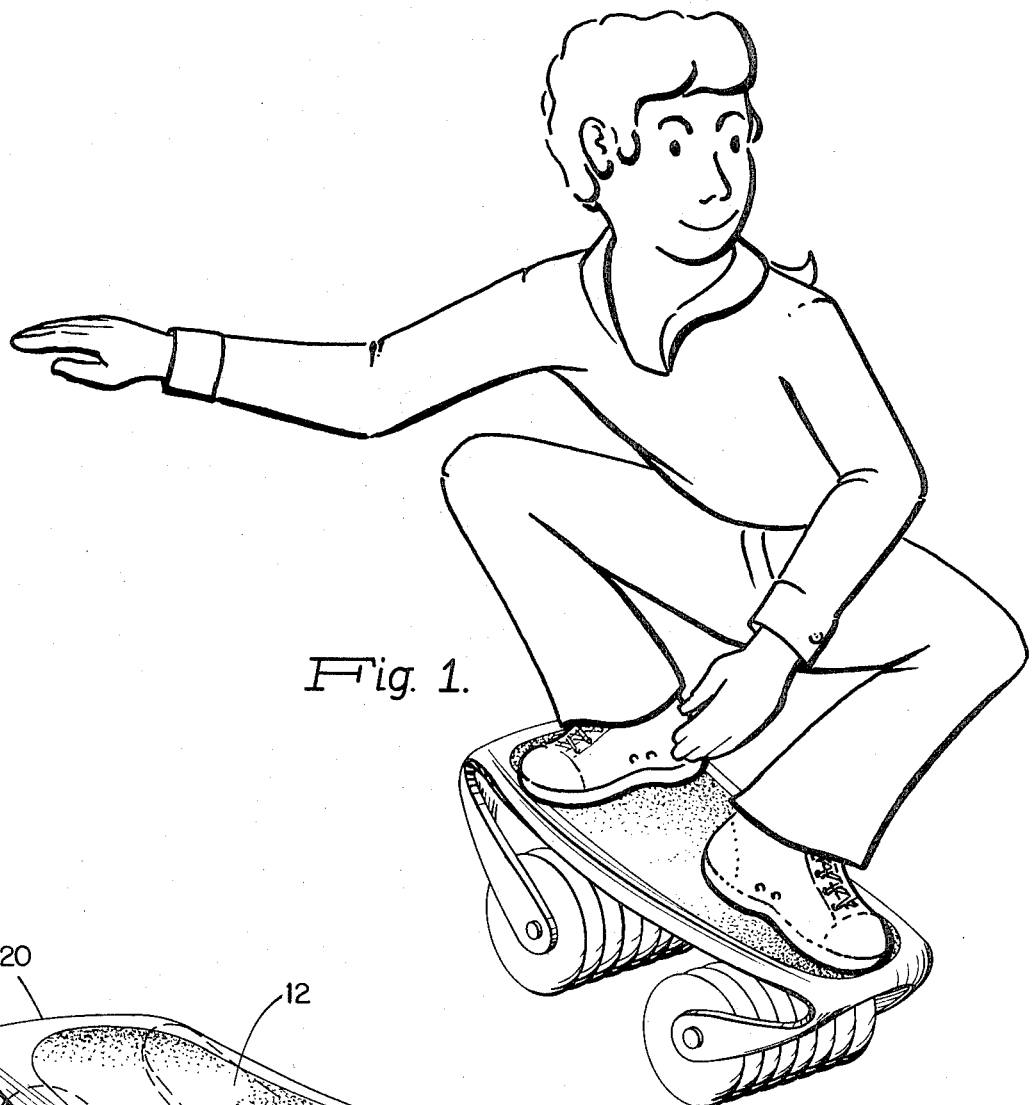
FIG. 1 is a perspective view of the wheeled coasting device of this invention showing a child riding the device in a crouched, balanced position.
Figure 5:
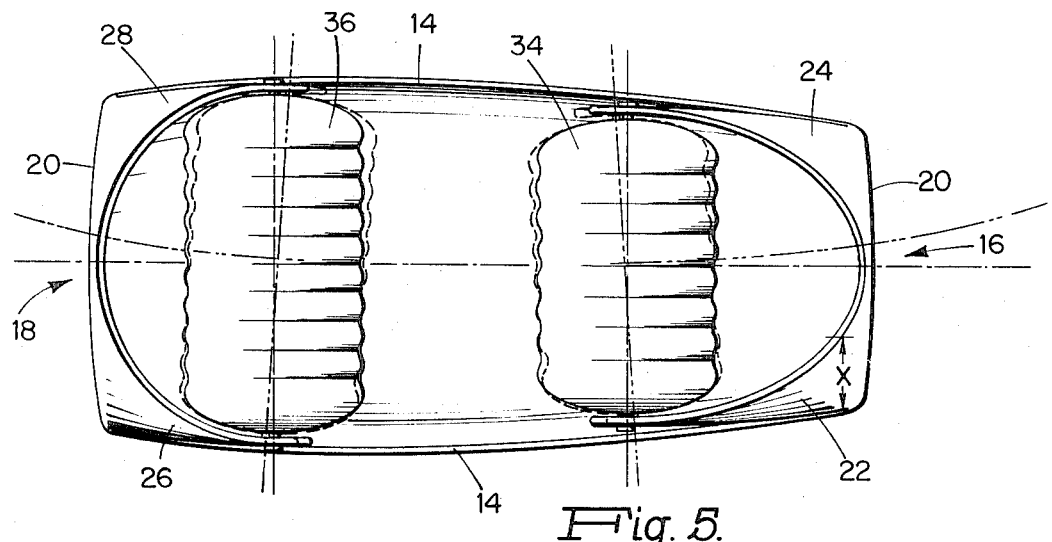
FIG. 5 is a plan view of the underside of the coasting device shown in FIG. 4, showing the straight ahead and turning positions of the wheels.

The coasting device has a horizontal platform 10 which is substantially rectangular, although slightly wider at the rear (see FIG. 5). Platform 10 is provided with a textured non-slip upper surface 12 to ensure secure footing and is structurally quite rigid in order to support the entire weight of the rider, as shown in FIG. 1. Platform 10 has downturned side edges 14 for safety and aesthetic reasons as well as for platform stiffening purposes.

Platform 10 has a front suspension means 16 extending downwardly and rearwardly from the front of the platform and a rear suspension means 18 extending downwardly and forwardly from the rear of the platform. These suspension means are integral extensions of the platform 10 and are folded downwardly and reversely to form junctions or roots 20 between the platform and the suspension means. These junctions 20 are the leading and trailing edges of the platform 10, as can best be seen in FIG. 3.

In the preferred embodiment, the front suspension means 16 has left and right suspension arm portions 22 and 24, respectively, and the rear suspension means 18 has left and right suspension arm portions 26 and 28, respectively. These arm portions flow smoothly downwardly and centrally from the junctions 20. The arm portions have their major horizontal dimensions X approximately parallel to the front of platform 10 (i.e., parallel to junctions 20) at their upper ends (see FIG. 5). They have their major horizontal dimensions Y approximately parallel to the platform side edges 14 at their lower ends (see FIG. 3).

Figure 3:
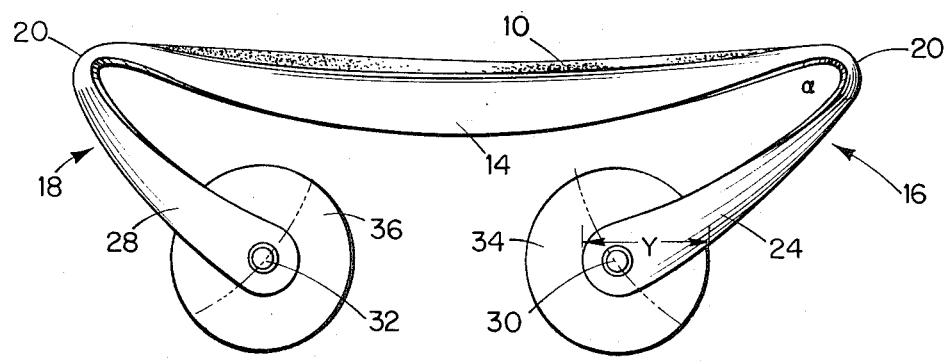
FIG. 3 is a side elevation view of the coasting device shown in FIG. 1.

The pairs of front and rear suspension arm portions are laterally spaced apart and are parallel to each other when not under any tension. The arms are relatively flexible and can be made to independently bend at junctions 20. As can be seen in FIG. 3, when additional weight is placed on platform 10 in an area over a particular suspension arm portion (e.g., right front portion 24), the platform in that area is lowered and the angle $\alpha$ between the platform 10 and the arm portion 24 is reduced. This causes the suspension arm portion 24 to pivot and warp about the junction 20 where the upper end of the arm meets the platform front edge. As the right front suspension arm portion 24 continues to pivot, its lower end moves away from the front of the coasting device towards the rear. When both of the suspension arm portions on one side of the platform are pivoting simultaneously (as when the rider places his weight near the center of one side edge 14), the lower ends of the two suspension arm portions on that side will move toward each other. Of course, when the platform is lowered on one side, it is raised on the other side, and the lower ends of the two suspension arm portions on that side will move away from each other.

The suspension arm portions are biased (i.e., stiffened) so that they can resiliently swing their lower ends in a limited arc about their upper ends (i.e., junctions 20) in longitudinal or front to rear planes. Obviously, the bending and warping is all carried out in the upper arm and junction areas where the major horizontal dimension is parallel with the junction 20. Very little bending occurs in the lower arm portions below the 90° twist.

It will be appreciated that although the preferred embodiment shown in the drawings takes the form of a thin shell one-piece molded plastic unit having an integral platform and four suspension arm portions, the invention could take other forms. For example, the right and left suspension arm portions could be connected and simply warp to permit independent pivot movements. Also, the platform could be a single element, and four individual arms could be resiliently pivoted to independent movements. These variations are mentioned because although the preferred embodiment is superior for various reasons (e.g., ease of manufacture, safety, attractiveness, etc.), other mechanical equivalents are also possible.

The coasting device is provided with a pair of parallel wheel axles which are supportably mounted in the lower ends of the suspension arm portions. Front axle 30 is carried by suspension arm portions 22 and 24, and rear axle 32 is carried by suspension arm portions 26 and 28.

Front axle 30 has mounted thereon a front wheel 34; and rear axle 32 mounts a rear wheel 36. Each wheel is preferably a cylindrical low pressure pneumatic tire having a corrugated tread with its ridges and valleys running around the circumference of the tire in parallel planes normal to the wheel axle. This tread configuration reduces rolling friction when the device is being coasted on hard pavement, while it increases the amount of tire surface engaging the ground when the device is being coasted on soft surfaces (e.g., grass, sand, etc.), so that the wheels don't dig in. The wheel preferably has a tread which is wider than the diameter of the wheel. Alternatively, each axle could mount more than one wheel. Other wheel shapes and materials can be employed, but the shown wheel is believed to be an optimum design for the purposes of this invention.

In use, the wheeled coasting device is frequently ridden much like a surf board, as shown in FIG. 1. The rider places his feet in the shown positions and can adjust his weight distribution on platform 10 in any manner that he desires. As he adjusts his weight distribution, he steers the wheels so that the device turns in any desired direction.

Figure 4:
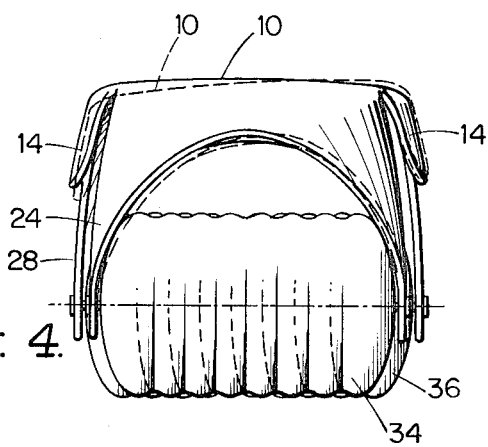
FIG. 4 is an end elevation view of the coasting device showing the straight ahead position, as well as the turning position in which the platform is tilted to one side and the nearest wheel is cocked toward that side.

As an example, if the rider leans to the right so that his center of gravity approaches the right downturned side edge 14 of the platform 10 (see FIG. 4), the platform tilts downwardly on the right side. This causes the angle α between the platform and right front and right rear suspension arm portions 24 and 28 to be reduced and causes the lower arm portions to be forced towards each other. Thus, as is shown in FIGS. 4 and 5 in dotted, both wheels cock oppositely to turn the coasting device to the right.

A relatively slight turn is produced if the rider places his weight over one of the front suspension arm portions so that only the front wheel 34 cocks while the rear wheel 36 remains straight. A somewhat sharper turn is produced if the rider places his weight over one of the rear suspension arm portions so that only the rear wheel 36 cocks while the front wheel 34 remains straight. A very sharp turn is produced if the rider places his weight intermediate the front and rear suspension arm portions near the side edge so that both wheels cock oppositely.

Of course, an experienced skillful rider can shift his weight in various ways to achieve subtle steering changes, but the principles involved remain the same. Also, the coasting device can be ridden from the prone, kneeling and sitting positions. These positions are usually assumed by younger children who have not yet developed the balance and coordination required to ride standing. The device can be turned by a prone, sitting or kneeling rider in exactly the same manner as that used by a standing rider. Furthermore, a pair of devices can be employed in the manner of roller skates.

Another function of the suspension means of this invention is its use as a shock absorber. This is very important because a conventional skate board transmits every bump and jolt received by the wheels directly to the rider. In this invention, the front and rear suspension means flex constantly to absorb shocks without affecting the steering. This gives the rider a much pleasanter ride.

The above description obviously suggests many possible variations and modifications of this invention which would not depart from its spirit and scope. It should be understood, therefore, that the invention is not limited in its application to the details of structure specifically described or illustrated and that within the scope of the appended claims, it may be practiced otherwise than as specifically described or illustrated.

I claim:

1. A wheeled coasting device comprising:
   a. a platform adapted to support a child rider;
   b. a front suspension means depending rearwardly from the front of said platform, and a rear suspension means depending frontwardly from the rear of said platform, each said suspension means including suspension arm portions which are laterally spaced apart and are substantially parallel to each other, each said suspension arm portion being biased to resistingly permit the lower end of said arm portion to resiliently swing in a limited arc about the upper end of said arm portion in a substantially front to rear plane;
   c. a pair of parallel wheel axles supportably mounted in the lower ends of said suspension arm portions; and
   d. at least one ground-engaging wheel carried by each said axle;
   whereby when the rider shifts his weight laterally to tilt the platform, the wheels cock oppositely to turn the coasting device in the direction of the weight shift.

2. The wheeled coasting device of claim 1 wherein said platform has a substantially rectangular shape.

3. The wheeled coasting device of claim 1 wherein said front and rear suspension means are integral extensions of said platform.

4. The wheeled coasting device of claim 3 wherein the junction between said platform and said suspension means warps in response to the shifting of the rider's weight to resistingly permit the swing of said suspension arm portion.

5. The wheeled coasting device of claim 3 wherein each said suspension arm portion has an approximately 90° twist therein, said suspension arm portion having its major horizontal dimension parallel to the front of said platform at its upper end, and having its major horizontal dimension parallel to the side of said platform at its lower end.

6. The wheeled coasting device of claim 1 wherein each said axle carries a single cylindrical wheel, each said wheel having a tread which is wider than the diameter of said wheel.

7. The wheeled coasting device of claim 6 wherein each said wheel includes a low pressure pneumatic tire having a corrugated tread, said corrugations running around said tire in parallel planes normal to said wheel axle.

8. The wheeled coasting device of claim 1 wherein said platform and suspension means comprise a one-piece molded plastic thin shell structure.

9. The wheeled coasting device of claim 1 wherein each said suspension arm portion is independently swingable in response to shifts of the rider's weight distribution on said platform.

10. The wheeled coasting device of claim 1 wherein a roughened non-slip texture is provided on the upper surface of said platform to improve its safe footing characteristics.

11. The wheeled coasting device of claim 1 wherein said suspension means act as shock absorbers.

12. The wheeled coasting device of claim 1 wherein said platform has a slightly upwardly concave shape and downturned side edges, said oppositely curved platform portions having a cooperative relationship which structurally stiffens said platform.

13. The wheeled coasting device of claim 1 wherein said platform has the substantial shape of a rider's foot.

* * * * *